Figure 1:
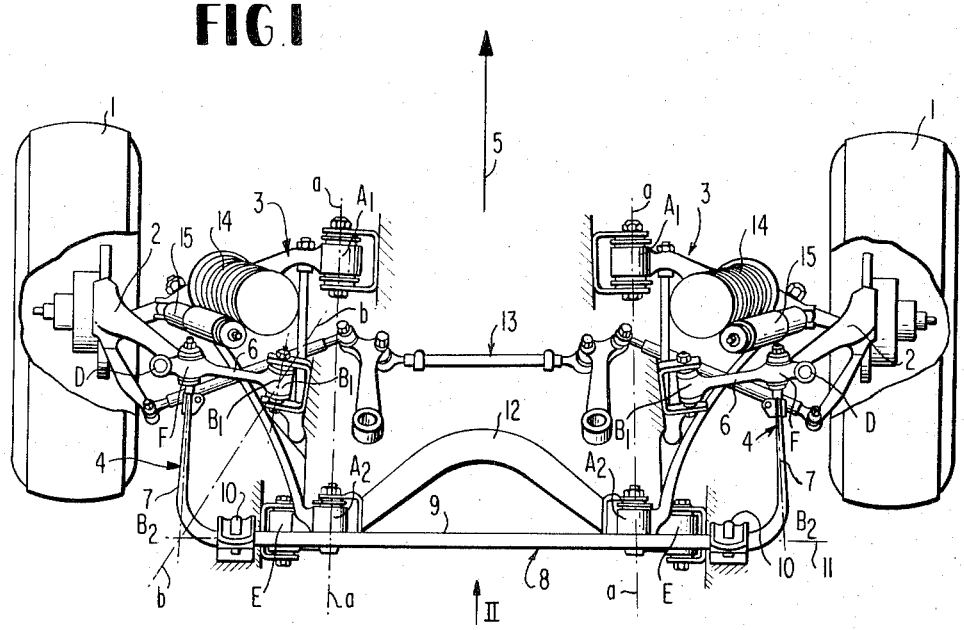

United States Patent [19]
Müller

[11] 3,831,970
[45] Aug. 27, 1974

[54] FRONT WHEEL SUSPENSION FOR MOTOR VEHICLES

[75] Inventor: Alf Müller, Bittenfeld, Germany

[73] Assignee: Daimler-Benz Aktiengesellschaft, Stuttgart, Germany

[22] Filed: Aug. 15, 1973

[21] Appl. No.: 388,658

[30] Foreign Application Priority Data
Dec. 30, 1972  Germany.......................... 2264300

[52] U.S. Cl........... 280/124 A, 280/96.2 R, 267/57
[51] Int. Cl.............................................. B60g 11/50
[58] Field of Search ....... 280/124 A, 124 B, 96.2 R; 267/20 A, 57

[56] References Cited
UNITED STATES PATENTS
2,215,751  9/1940  Coleman.......................... 280/124 A
2,245,809  6/1941  Olley............................... 280/124 B Primary Examiner—Philip Goodman
Assistant Examiner—John A. Carroll
Attorney, Agent, or Firm—Craig & Antonelli

[57] ABSTRACT

A front wheel suspension for motor vehicles with a wheel guide system formed by two superposed cross guide members on each side of the vehicle of which the lower cross guide member which has a pivot axis extending in the vehicle longitudinal direction includes a substantially transversely extending front arm and an obliquely rearwardly inwardly extending rear arm while the upper cross guide member includes a guide rod extending essentially in the vehicle transverse direction; the upper cross guide member thereby has a pivot axis extending obliquely outwardly from in front toward the rear while a U-shaped torsion rod is connected with its forwardly extending arms to the corresponding guide rods of the upper cross guide members to thereby form in effect the associated rear guide arms of the upper cross guide members.

18 Claims, 2 Drawing Figures

3,831,970

FRONT WHEEL SUSPENSION FOR MOTOR VEHICLES

The present invention relates to a front wheel suspension for motor vehicles, especially for passenger motor vehicles with wheel guide systems formed by double cross guide members, of which the lower cross guide member has a pivot axis extending in the vehicle longitudinal direction, and with a torsion rod stabilizer connecting two mutually corresponding cross guide members.

In prior art front wheel suspensions of this type, the lower cross guide members are supported by way of the stabilizer torsion rod which customarily lies in front of the front axle underneath the engine. It is disadvantageous with such an arrangement that the torsion rod, in addition to having to absorb the spring forces, has to absorb the large guide forces (especially braking forces) of the lower support, whence the torsion rod bearing support cannot be designed and constructed in an optimum manner as regards noise and shock insulation. Additionally, with such type of construction the front section of the frame-floor assembly is strongly loaded which requires for the same a relatively heavy type of construction and additionally may initiate undesirable vibration appearances ("front shaking").

In addition thereto, also front wheel suspensions of the aforementioned type are known in the prior art, in which the lower cross guide member is supported toward the rear by way of the torsion rod stabilizer which is disposed underneath the engine at the vehicle floor. With such an arrangement, the stabilizer arms are now stressed as support elements primarily in compression and, in addition to the aforementioned disadvantages, there exists therefore additionally danger of buckling or bending.

The present invention is concerned with the task to so further improve a front axle of the aforementioned type, which already enables a favorable design of the camber change during spring deflections, with a view toward a particular simple construction, in which a favorable absorption of the forces at the vehicle is to be assured, and more particularly both of the support as also of the braking forces.

According to the present invention, this can be achieved with a front wheel suspension for motor vehicles having a wheel guide system constituted by double cross-guide members, of which the lower cross guide member has a pivot axis extending in the vehicle longitudinal direction, and with a torsion rod stabilizer connecting two mutually corresponding cross guide members, in that with an essentially transversely extending forward arm and an obliquely rearwardly extending rear arm of the respective lower cross guide member, the torsion rod stabilizer connects the upper cross guide members which are pivotal about pivot axes extending obliquely outwardly from in front toward the rear, and in that the torsion rod stabilizer is connected with each of its arms extending forwardly in the vehicle longitudinal direction to the corresponding forward guide arm constituted by a guide rod extending in the vehicle transverse direction and thereby forms the associated rear guide arm of the upper cross guide member.

With such a construction, there results from the coupling of the torsion rod stabilizer with the upper cross guide member, particularly in conjunction with a high connection of the upper cross guide member and with the large support base resulting therefrom for the wheel carrier, that during braking only relatively small forces become effective in the torsion rod bearing supports. The torsion rod bearing supports can therefore be constructed soft with a view toward an optimum noise and shock insulation. Since with the solution according to the present invention also the support and braking forces absorbed by the lower cross guide member are conducted or transmitted toward the rear by reason of the longitudinal support of the guide members, the frame-front section is relieved in the solution according to the present invention and the same can therefore be constructed more light-weight without having to fear vibrational appearances ("front section shaking").

It is appropriate in realization of the present invention if the torsion rod stabilizer is supported at the end wall of the vehicle. A further unloading of the frame front section is achieved by such a construction and the torsion rod is utilized additionally as safety element. By reason of its location to the rear of the engine and in front of the end wall, the torsion rod more particularly also elastically absorbs and catches the engine and transmits in particular the mass forces of the engine over the entire width of the front section whereby a penetration of the engine into the passenger cell is avoided.

In order to avoid undesirable stresses between the torsion rod stabilizer and the guide rods connected with the same, the arms of the torsion rod stabilizer, within the scope of the present invention, are pivotally connected with the respective guide rod extending in the vehicle transverse direction.

Following a further feature of the present invention, the arms of the torsion rod stabilizer may be forged sword-shaped for increasing the yieldingness in the vehicle cross direction and for the reinforcement in the height direction so that also with a slight rod thickness a sufficient bending rigidity in the vertical direction is assured with a good yieldingness in the vehicle cross direction.

Accordingly, it is an object of the present invention to provide a front wheel suspension for motor vehicles which avoids by simple means the aforementioned shortcomings and drawbacks encountered in the prior art.

Another object of the present invention resides in a front wheel suspension for motor vehicles, especially passenger motor vehicles in which the bearing support of the torsion rod can be designed optimum as regards noise and shock insulation.

A further object of the present invention resides in a front wheel suspension for motor vehicles which eliminates the need for a relatively heavy construction of the frame-floor installation in the front section of the vehicle without the danger of the appearance thereat of undesirable vibrations or shaking.

A still further object of the present invention resides in a front wheel suspension of the aforementioned type which not only permits an optimum design of the bearing supports of these torsion rod stabilizers but also avoids the danger of buckling thereof under the stresses which normally occur.

Still another object of the present invention resides in a front wheel suspension for motor vehicles which not only permits a favorable design of the camber change during spring deflections but also assures a favorable absorption of the forces including support and braking forces.

A further object of the present invention resides in a front wheel suspension with a torsion rod stabilizer for motor vehicles in which only relatively small forces become effective in the torsion rod bearing supports during braking while avoiding also undesired stresses between the torsion rod stabilizer and the guide rods connected thereto.

Another object of the present invention resides in a front wheel suspension which considerably improves the safety of the vehicle, particularly as regards the penetration of the engine into the vehicle cell.

A still further object of the present invention resides in a front wheel suspension for motor vehicles in which torsion rods with relatively slight thickness can be used which nonetheless assure a sufficient bending rigidity in the vertical direction yet offer sufficient yieldingness in the vehicle cross direction.

Figure 2:
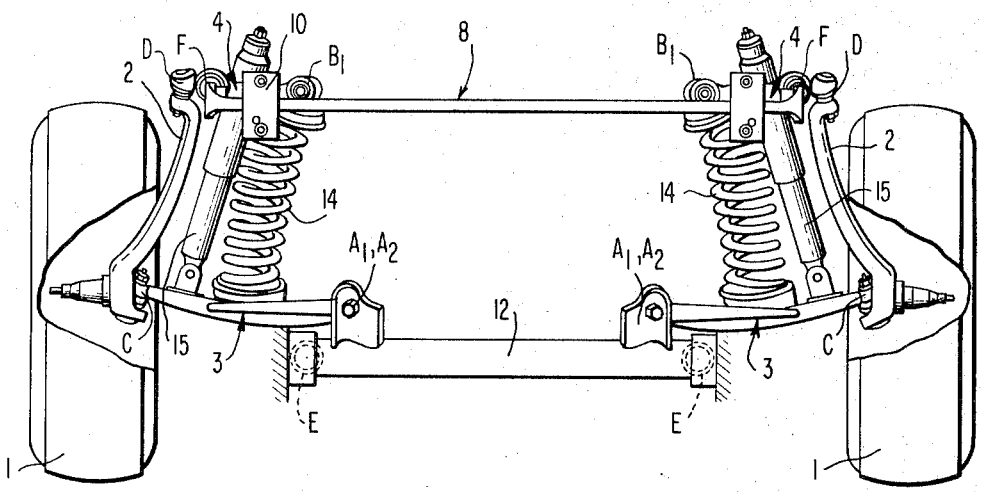

These and further objects, features and advantages of the present invention will become more apparent from the following description when taken in connection with the accompanying drawing which shows, for purposes of illustration only, one embodiment in accordance with the present invention, and wherein:

FIG. 1 is a plan view on a front axle of a passenger motor vehicle with a front wheel suspension according to the present invention in which the illustration of the body or of the frame of the vehicle was dispensed with for the sake of clarity; and FIG. 2 is an elevational view of the front axle according to FIG. 1, taken in the direction of arrow II.

Referring now to the drawing wherein like reference numerals are used to designate like parts in the two figures thereof, the wheels are designated in the two figures by reference numeral 1 which are steerably guided by way of the wheel carriers 2. The wheel carriers 2 are guided by way of the triangular like cross guide members generally designated by reference numerals 3 and 4, of which the respective lower cross guide member 3 has a pivot axis a-a extending essentially in the driving direction 5 (FIG. 1) which is determined by the points of pivotal connection $A_1$ and $A_2$ on the frame side. The forward point of pivotal connection $A_1$, i.e., forward as viewed in the driving direction 5, is thereby located near the vertical vehicle cross plane containing the wheel axes whereas the rear point of pivotal connection $A_2$ is offset relatively far toward the rear with respect to this plane so that a wide support base results for the lower cross guide member 3. The point of pivotal connection of the lower cross guide member at the wheel carrier is designated by reference character C (FIG. 2).

The upper cross guide member 4 includes according to the present invention a guide rod 6 extending in the vehicle cross direction whose point of pivotal connection on the body side is designated by reference character $B_1$. The point of pivotal connection of the guide rod 6 on the wheel carrier side is designated by reference character D. Near this point of pivotal connection D the guide rod 6 is connected with the respective corresponding arm 7 of the torsion rod stabilizer generally designated by reference numeral 8 which is U-shaped in plan view and which, within the area of its center section 9 extending in the vehicle cross direction, is pivotally connected by way of bearing supports 10 at the end wall of the vehicle which is only schematically indicated. The bearing supports 10 involve elastic bearings in which the torsion rod stabilizer 8 is pivotally guided about the axis 11 of the center portion 9. The point of intersection between the axis 11 and the extension of a respective arm 7 of the stabilizer 8 determines, as indicated, the second point of pivotal connection, fictitious herein, of the upper cross guide member 4 on the body side which is designated by reference character $B_2$, by means of which, together with the point of pivotal connection $B_1$, is determined the pivot axis b—b of the upper cross guide member 4, which, as viewed in plan view, extends obliquely outwardly from in front toward the rear. This can be readily seen from FIG. 1. Both the pivot axis a—a of the lower guide member 3 as also the pivot axis b—b of the upper guide member extend in the illustrated embodiment with a slight inclination downwardly toward the rear as viewed in side view (not shown); this inclination, however, is only very slight. In conjunction with the slight inclination of the pivot axes of the cross guide members with respect to the plane of the road surface, in relation to the normal position thereof, the inclined position of the pivot axes of the upper guide member 4 with respect to the driving direction 5 results with the solution of the present invention in a braking support which reinforces itself with increasing braking.

As is illustrated in plan view according to FIG. 1, the points of pivotal connection $A_1$ and $A_2$ on the body side are disposed at a relatively large distance one behind the other in the driving direction 5 so that a wide support base results, with which a sufficiently accurate wheel guidance is assured also in case of a relatively soft construction of the points of pivotal connection. The longitudinal support realized by the given construction of the lower guide member toward the rear has as a consequence, in conjunction with the support of the upper cross guide member 4 which insofar as comparable also takes place toward the rear, that the frame front section (not shown) is far-reachingly unloaded or relieved so that vibrations in the frame front section (front section shaking) are eliminated.

In the illustrated embodiment, the rear points of pivotal connection $A_2$ of the lower cross guide member 3 are not secured directly at the body or at the vehicle frame but instead are pivotally connected at a cross yoke 12 which, in its turn, is connected with the body or the like in points of pivotal connection E. Since also the pivotal connection in the points of pivotal connection E is constructed elastically, vibrations, noises and shocks are damped particularly well.

As is shown from the illustration according to FIG. 2, the torsion rod stabilizer 8 extends with its center section 9 at the height of the upper cross guide member 3 nearly over the entire vehicle width. This position of the stabilizer 8 effects an additional protection against the penetration of the vehicle engine into the vehicle as might be the case, for example, during a front end collision. This is so as the engine (not shown) which is disposed in the driving direction essentially in front of the torsion rod stabilizer 8 is caught by the latter.

Furthermore, the steering system which is generally designated by reference numeral 13 is also indicated in FIG. 1. In the illustration according to FIG. 2, the steering system is not shown in order to avoid an overcrowding of this figure. Furthermore, the support springs of the vehicle are designated in the figures by reference numeral 14 and the shock absorbers by reference numeral 15 whereby both the support springs 14 as well as the shock absorbers 15 are supported on the respective forward arm of the lower cross guide member 3 and whereby the shock absorbers 15 are disposed between a respective support spring 14 and the associated wheel 1.

It can be additionally seen from the figures that the arms 7 of the torsion rod stabilizer 8 are forged out sword-shaped increasingly toward their free ends, and more particularly in such a manner that they possess a higher bending rigidity in the vertical direction than in the vehicle cross direction. As a result thereof, an unnecessary stressing of the torsion rod stabilizer is avoided during spring action. Furthermore, it is also avoided by this measure in conjunction with the pivotal mounting of the arms 7 at the guide rods 6 in the points of pivotal connection F that loads and stresses become effective in the wheel guide means by the unnecessary high bending rigidity of the arms 7 in the vehicle transverse direction, which lead to undesired stresses in the elastic bearing supports.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A front wheel suspension for motor vehicles which comprises wheel guide systems including double cross guide means, of which the lower cross guide means has a pivot axis extending substantially in the vehicle longitudinal direction, and a torsion rod stabilizer means operatively connecting with each other two mutually corresponding cross guide means, characterized in that the torsion rod stabilizer means operatively connects with each other the upper cross guide means which have a pivot axis extending obliquely outwardly from in front toward the rear, the upper cross guide means including a guide rod extending approximately in the vehicle transverse direction, the torsion rod stabilizer means having arm portions extending forwardly generally in the vehicle longitudinal direction and being operatively connected with a respective guide rod.

2. A front wheel suspension according to claim 1, characterized in that the respective arm portion of the torsion rod stabilizer means which extends in the vehicle longitudinal direction forms the associated rear guide arm of the upper cross guide means.

3. A front wheel suspension according to claim 2, characterized in that the lower cross guide means includes a substantially transversely extending forward arm and an obliquely rearwardly inwardly extending rear arm.

4. A front wheel suspension for a vehicle with a front end wall of a passenger cell according to claim 3, characterized in that the torsion rod stabilizer means is supported at the end wall of the vehicle.

5. A front wheel suspension according to claim 4, characterized in that the arm portions of the torsion rod stabilizer means are pivotally connected with the guide rods of the upper cross guide means.

6. A front wheel suspension according to claim 5, characterized in that the arm portions of the torsion rod stabilizer means are forged out sword-shaped for increasing the yieldingness in the vehicle transverse direction.

7. A front wheel suspension for a motor vehicle with a superstructure according to claim 6, characterized in that the front arm of the lower cross guide means is elastically pivotally connected at the vehicle superstructure while the rear arm of the lower cross guide means is elastically pivotally connected at a generally transversely extending cross yoke which is elastically pivotally connected on both sides at the vehicle superstructure.

8. A front wheel suspension according to claim 7, characterized in that the points of pivotal connection of the rear arms of the lower cross guide means at the cross yoke are disposed higher than the points of pivotal connection of the cross yoke at the superstructure.

9. A front wheel suspension according to claim 8, characterized in that the points of pivotal connection of the rear arms of the lower cross guide means at the cross yoke are offset forwardly in the longutidnal direction of the vehicle with respect to the points of pivotal connection of the cross yoke at the superstructure.

10. A front wheel suspension according to claim 9, characterized in that the pivot axes of the upper and lower cross guide means are slightly inclined downwardly rearwardly, as viewed in side view.

11. A front wheel suspension according to claim 1, characterized in that the arm portions of the torsion rod stabilizer means are pivotally connected with the guide rods of the upper cross guide means.

12. A front wheel suspension according to claim 11, characterized in that the arm portions of the torsion rod stabilizer means are forged out sword-shaped for increasing the yieldingness in the vehicle transverse direction.

13. A front wheel suspension for a vehicle with a front end wall of a passenger cell according to claim 1, characterized in that the torsion rod stabilizer means is supported at the end wall of the vehicle.

14. A front wheel suspension according to claim 1, characterized in that the arm portions of the torsion rod stabilizer means are forged out sword-shaped for increasing the yieldingness in the vehicle transverse direction.

15. A front wheel suspension for a motor vehicle with a superstructure according to claim 1, characterized in that the front arm of the lower cross guide means is elastically pivotally connected at the vehicle superstructure while the rear arm of the lower cross guide means is elastically pivotally connected at a generally transversely extending cross yoke which is elastically pivotally connected on both sides at the vehicle superstructure.

16. A front wheel suspension according to claim 15, characterized in that the points of pivotal connection of the rear arms of the lower cross guide means at the cross yoke are disposed higher than the points of pivotal connection of the cross yoke at the superstructure.

17. A front wheel suspension according to claim 16, characterized in that the points of pivotal connection of the rear arms of the lower cross guide means at the cross yoke are offset forwardly in the longitudinal direction of the vehicle with respect to the points of pivotal connection of the cross yoke at the superstructure.

18. A front wheel suspension according to claim 1, characterized in that the pivot axes of the upper and lower cross guide means are slightly inclined downwardly rearwardly, as viewed in side view.

* * * * *